United States Patent [19]

Gaucher

[11] Patent Number: 4,786,789
[45] Date of Patent: Nov. 22, 1988

[54] APPARATUS FOR PROCESSING VOUCHERS, IN PARTICULAR CHECKS

[75] Inventor: Michel M. Gaucher, Le Mesnil Saint Denis, France

[73] Assignee: Electronique Serge Dassault, Paris, France

[21] Appl. No.: 810,079

[22] Filed: Dec. 17, 1985

[30] Foreign Application Priority Data

Feb. 6, 1985 [FR] France ................... 8501661

[51] Int. Cl.[4] ............................................ G06F 15/12
[52] U.S. Cl. ............................ 235/432; 235/379;
  400/124; 400/188; 400/231
[58] Field of Search ............... 235/379, 432, 475, 480;
  101/66, 415.1; 400/124, 188, 231, 265, 282, 31, 32

[56] References Cited

U.S. PATENT DOCUMENTS

| | | | |
|---|---|---|---|
| 4,027,142 | 5/1977 | Paup et al. | 235/379 |
| 4,082,945 | 4/1978 | Van De Goor | 235/419 |
| 4,219,280 | 8/1980 | Maeda | 400/124 |
| 4,617,457 | 10/1986 | Granzow et al. | 235/379 |

FOREIGN PATENT DOCUMENTS

| | | |
|---|---|---|
| 19080 | 11/1980 | European Pat. Off. |
| 2951069 | 7/1981 | Fed. Rep. of Germany ...... 400/188 |
| 2507965 | 12/1982 | France . |
| 2538145 | 6/1984 | France . |

Primary Examiner—David L. Trafton
Attorney, Agent, or Firm—Christie, Parker & Hale

[57] ABSTRACT

Apparatus for processing checks comprises an internal path defined by a toothed belt (10) passing round a enclosed loop from inlet wheels (111, 112) to outlet wheels (115) followed by a disengagement curve (125, 126).

Along this path there are provided: a station (50) for magnetizing and reading CMC7 or E13B characters, a station (60) for printing on the check by means of a dot matrix print head subjected to displacement along a circular arc and enabling printing to make place on the front or reverse face of the check as selected by the user, a station (70) for post printing the amount of the check in CMC7 or E13B characters, and a station (80) for printing a fixed endorsement.

Subsequent processing of the check is then considerably simplified for the customer, the trader, and the bank. FIG. 2.

25 Claims, 9 Drawing Sheets

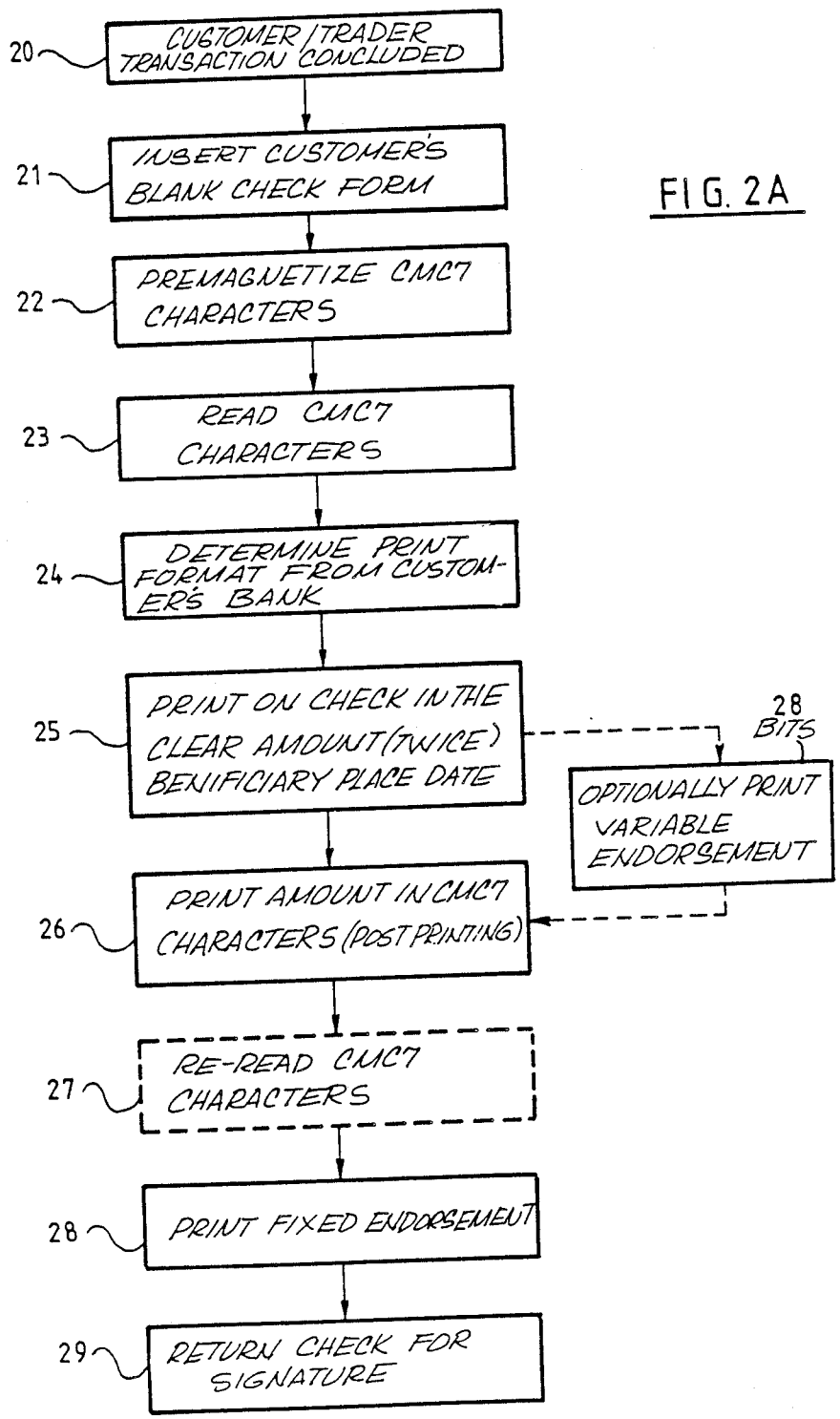

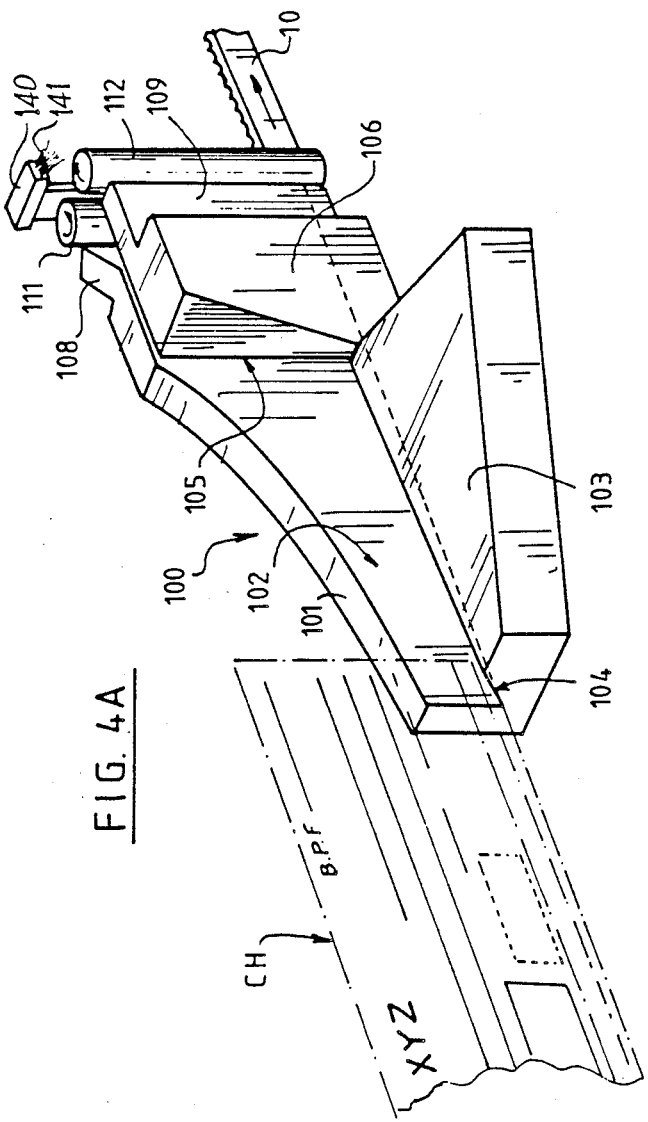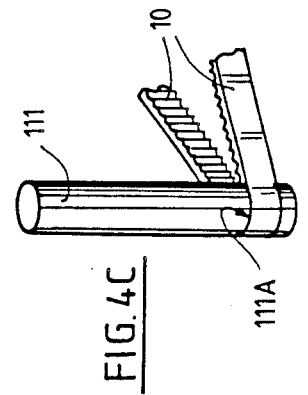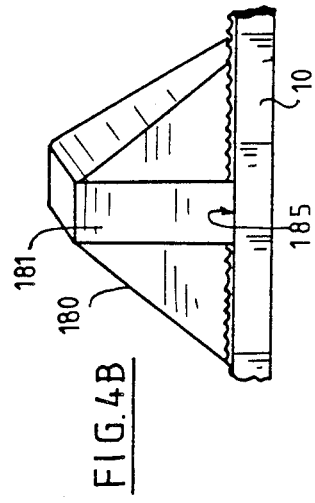

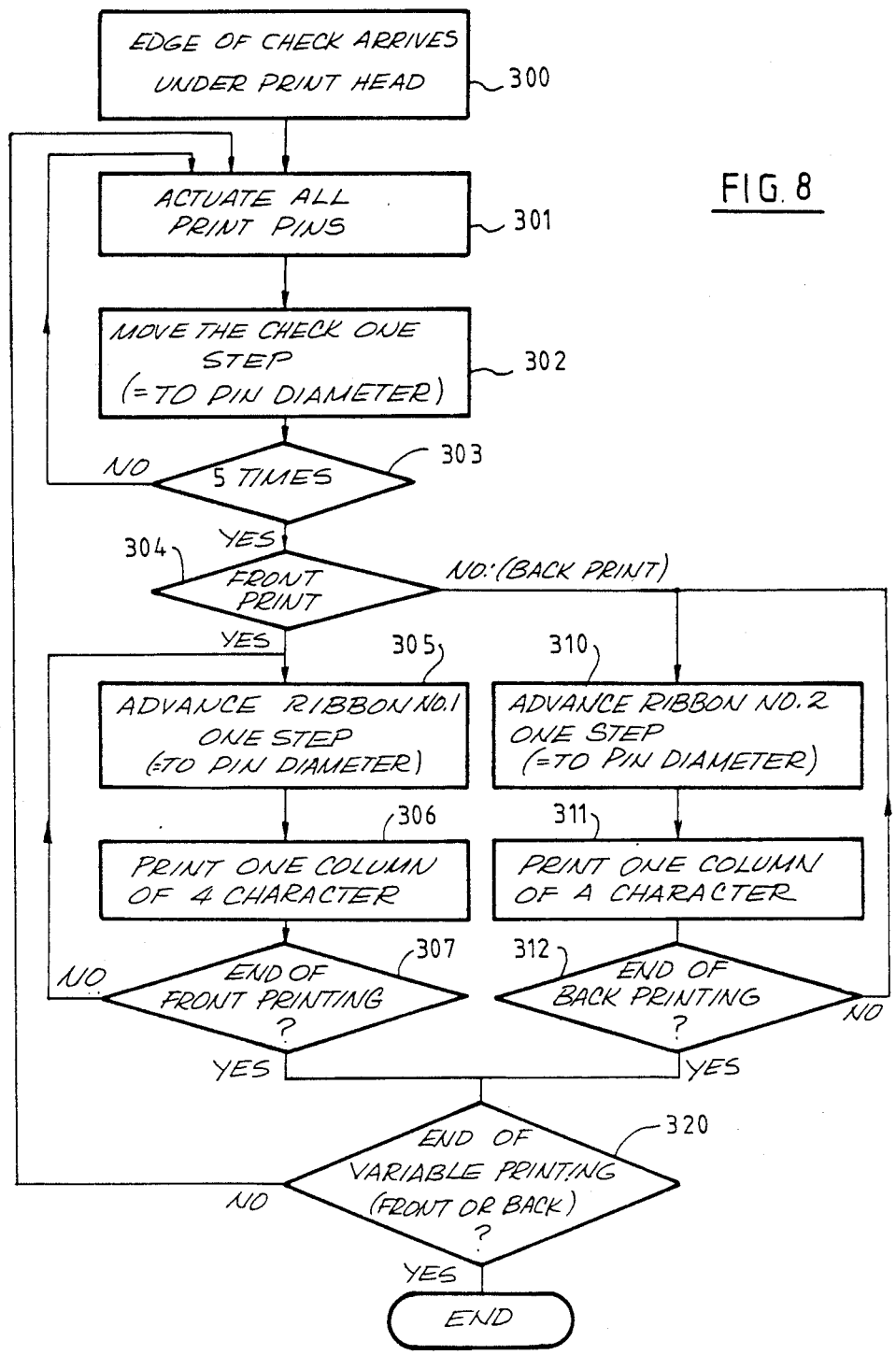

APPARATUS FOR PROCESSING VOUCHERS, IN PARTICULAR CHECKS

The invention relates in a general manner to apparatus for processing vouchers made of card/paper, and is applicable, in particular, to processing checks.

The Applicant has already described various aspects of devices for processing vouchers, in French Pat. No. 75 37 475, published under the No. 2 334 501, in French patent application No. 83 11 444, published under the No. 2 548 804, and also in French patent applications No. 84 10378 published under No. 2,566,941, priority of which is claimed in U.S. patent application, Ser. No. 672,184, filed on Nov. 16, 1984; French patent application No. 84 10 379 published under No. 2,566,704; and French patent application No. 84 10 380 published under No. 2,566,705, priority of which is claimed in U.S. patent application Ser. No. 672,185, filed on Nov. 16, 1984. This prior patent and these prior patent applications relate in particular to travel tickets or similar documents.

The present concern relates to improving the processing of checks. It is well known that bank processing of checks through a clearing-house is expensive.

Remedies have been proposed which are referred to as "electronic payment". However such remedies do not seem to be destined to cause checks to disappear completely.

They are thus going to remain in numerous commercial operations.

The Applicant has thus addressed the problem of providing apparatus for processing checks and capable of being installed locally on the premises of numerous traders, such apparatus thus being cheap while simplifying as much as possible those operations which remain to be performed by the client, the trader, and the issuing bank.

Thus, apparatuses are already known, for example, which fill in a check in a simplified manner, transversally to the normal direction of writing on a check. A check which has been filled in in this way is often poorly understood by the account holder, who is used to applying different rules for filling in checks, which rules have heretofore not had any exceptions. Further, such apparatuses fall short of completely solving the problem.

The present invention proposes apparatus for processing vouchers, and in particular checks, and which provides, in contrast, a satisfactory solution to the problem.

A first aim of the invention is to provide apparatus for processing vouchers and suitable for filling in a document such as a check line-by-line in ordinary writing, using print means which are as simple and as cheap as possible.

Another aim of the invention is to provide adequate check driving along a path which is defined by a single belt, while ensuring that the check remains parallel to its direction of displacement along the entire path.

Another aim of the invention is to define apparatus in which a reference position relative to a check is defined in very simple manner, which position is applicable all along the check path.

Another aim of the invention is to enable standardized characters marked on a check to be read, and in particular CMC7 or E13B characters, and to do this both simply and cheaply.

Another aim of the invention is to enable a check to be post-printed to add the amount of the check in standardized characters (CMC7, E13B, etc.).

Another aim of the invention is to enable the beneficiary's own form of words to be endorsed on the back of the check. Such a form of words may be constant or variable.

The present invention provides apparatus for processing vouchers, and in particular checks, of the type comprising means for driving a voucher from an inlet along a path internal to the apparatus, said drive means including a belt which presses against wheels mounted on a carrier plate to follow a closed circuit having a portion defining said internal path, which portion passes past a print station.

According to a first aspect of the invention, the print station comprises, on one side of the internal path, a print head associated with a transfer inking ribbon driven by means of a program-controlled motor (the ribbon moving through a distance equal to one pin diameter each time a pin strikes) and hinged to the apparatus carrier plate, said print head thus being subjected to vertical displacement along an arc of a circle; and, on the other side of the internal path, an anvil suitable for operating with the print head in any of its positions along the arc of the circle.

Preferably, the anvil includes a working portion whose horizontal extent is equal to not less than the geometrical rise of said arc of a circle. In practice, the anvil is fixed to the carrier plate. Advantageously, the anvil receives said belt in a recess where it runs level with the remainder of its working portion, and at least in some applications is contiguous therewith.

The print head may be simply hinged to the frame. In a variant, the print head is mounted on an arm of an articulated deformable parallelogram structure thereby enabling the print head to follow a circular arcuate path while remaining parallel to itself.

According to another aspect of the invention, the belt drives the voucher along one longitudinal edge of the voucher and voucher braking means such as a brush are placed along the opposite longitudinal edge of the voucher downstream from the first wheel where the voucher passes between a wheel and the belt, thereby ensuring that the voucher is properly inserted with its longitudinal edge coming into contact with said carrier plate.

The apparatus may also include, upstream from said first wheel, a voucher-presence detector, such as a photoelectric barrier, placed in the immediate vicinity of said carrier plate. It is also advantageous for the apparatus to include a further presence detector such as a photoelectric barrier located at the print station and likewise placed in the immediate vicinity of the thrust plate, which provides a reference position relative to both sides of the voucher for printing thereon.

According to another aspect of the invention, in which the voucher is a check or the like, having automatically readable standardized characters thereon, a reading station for such characters is provided along the internal path, thereby enabling the voucher or the person issuing the voucher to be recognized and to determine the format for printing on the voucher. Since the standardized characters are of the magnetically-encoded type, the read station comprises a read head for such characters, which head is also used prior to reading for premagnetizing said characters.

Other characteristics and advantages of the invention appear from the following detailed description and the accompanying drawings, in which:

FIG. 2A is a flow chart summarizing the operations by which a check is processed in accordance with the invention;

FIG. 4A is a perspective view showing a check inlet station to the apparatus;

FIG. 4B is a perspective view showing the print anvil of apparatus in accordance with the invention;

FIG. 4C is a perspective view showing a detail of an inlet wheel to the apparatus in accordance with the invention;

FIG. 8 is a flow chart of the operations for printing in the clear in said variant.

The drawings which are certain in nature and/or to scale, and in particular FIGS. 2A, 3, 4A, 4B, 4C, 5, 6, 7, and 8, may be used to add to the description and the definition of the invention.

Figure 1:
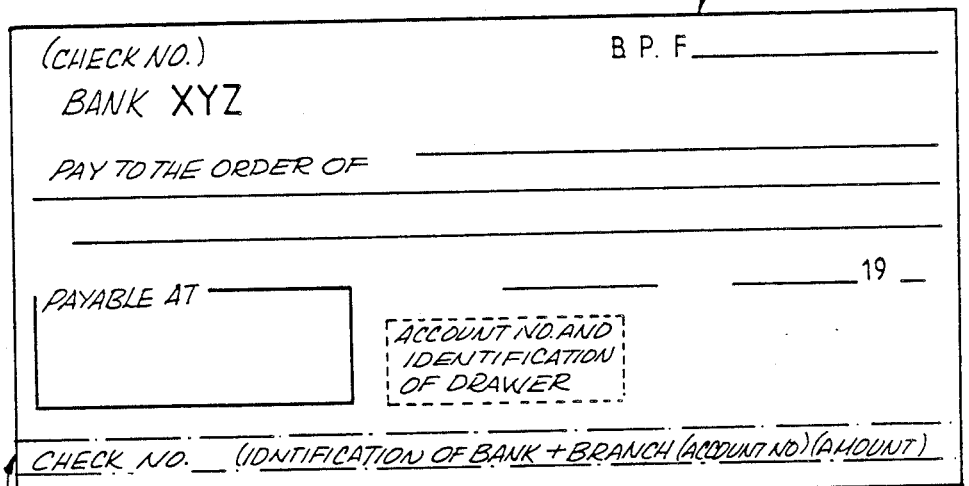
FIG. 1 shows the general appearance of a bank check.

In reference to FIG. 1, a check must, prior to signature, be filled in with a sum written in figures (where marked BPF), the sum must be specified a second time, and this must be in letters if the check is hand written, with the second entry being admissible in figures if the digits are printed characters. The check must also include the name of its beneficiary, together with an indication of the place and the date of issue.

The owner of the account signs the check. Thereafter it is endorsed by the trader using a form of words for endorsement together with the trader's signature, and then transferred to the trader's bank (in general a different bank) for paying in. The funds corresponding to checks are transferred by inter-bank compensation. Naturally, this operation is automated. It begins by automatically reading the track of standardized characters on the check (and in France they are CMC7 characters). Initially this track includes the number of the check, the identity of the issuing bank, the branch where the account is held, and the number of the account. The remaining important information which cannot appear on this track initially is the amount of the check. An operation of "post-printing" consists in the amount being written on the check in CMC7 characters by an operator, in the light of the two entries concerning the amount which appear in the clear on the check. This operation is necessarily manual and is one of the main causes of the cost of bank processing of checks.

It will be understood below that the present invention provides considerable simplification in the operations outlined above, since they can now all be performed at the same time and entirely automatically as soon as the transaction paid for by the check is concluded.

Figure 2:
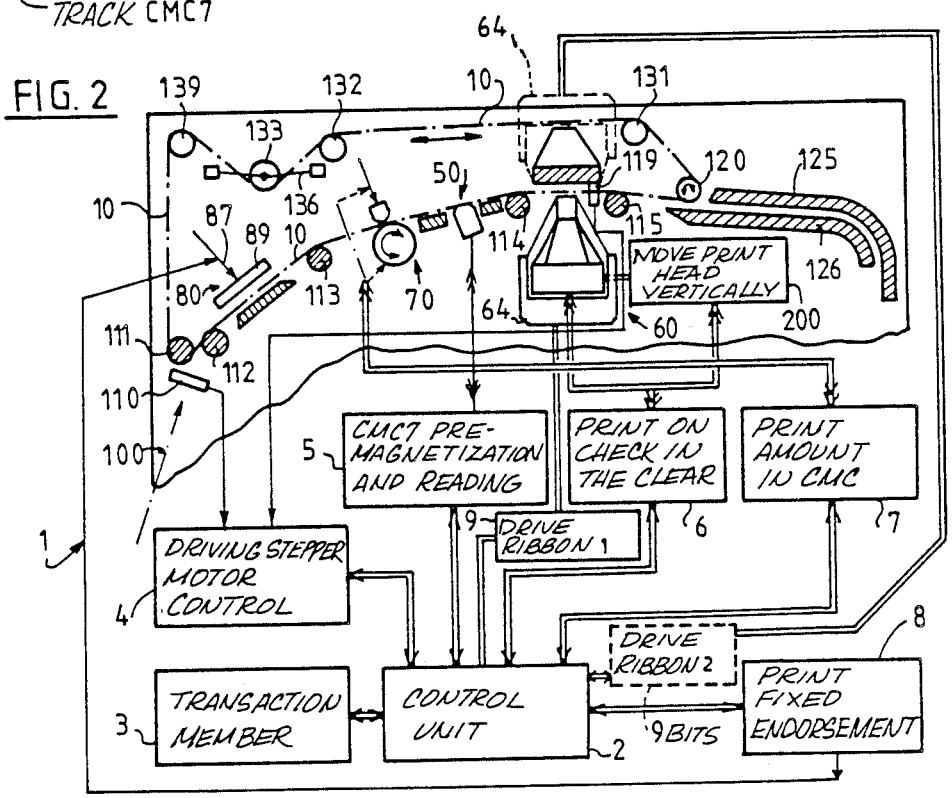
FIG. 2 is a block diagram of apparatus in accordance with the invention together with its electronic means.
Figure 3:
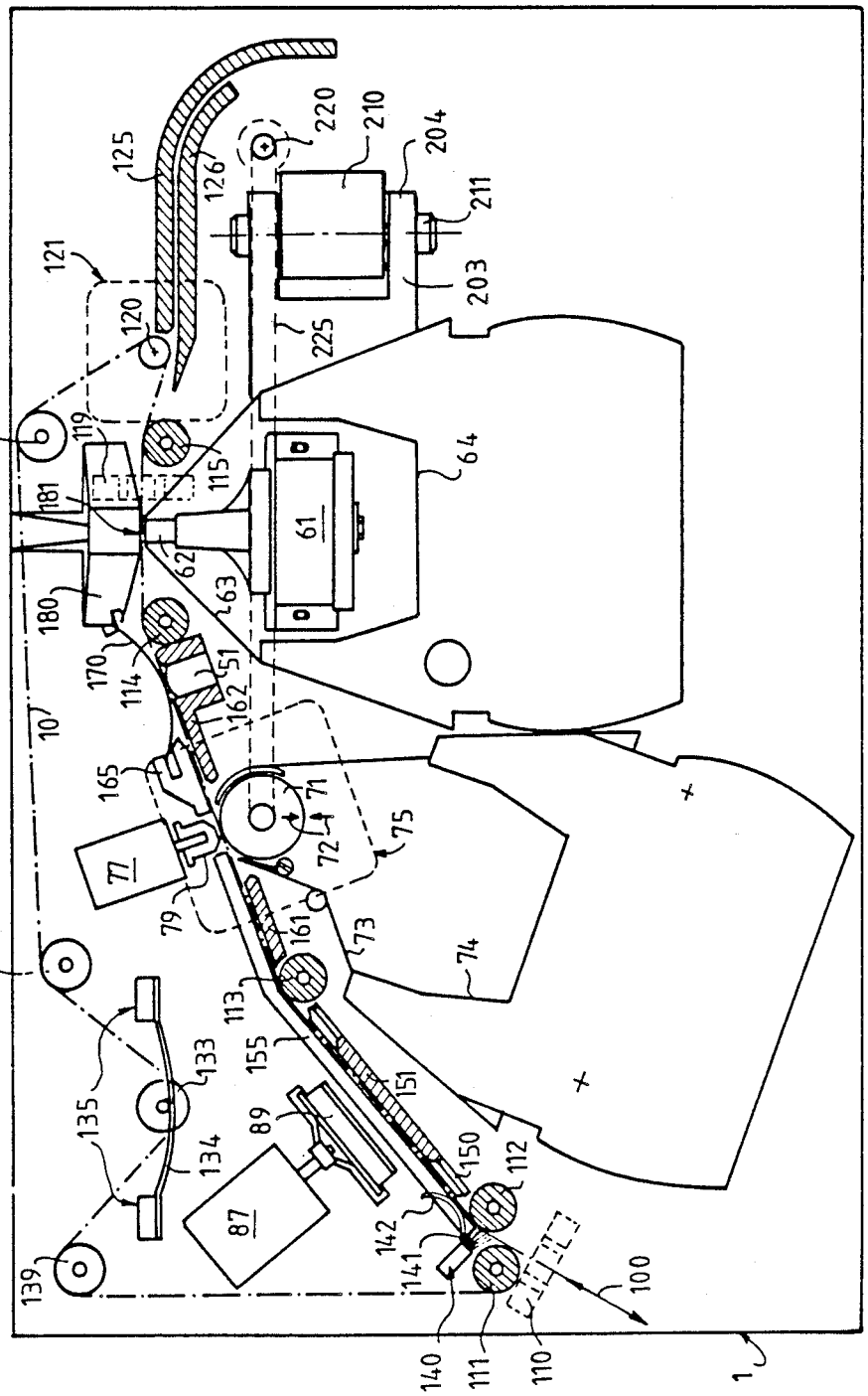
FIG. 3 shows the mechanical portion of a first embodiment of apparatus in accordance with the invention in greater detail.

Reference is now made to FIGS. 2 and 3.

A toothed belt 10 follows a closed circuit path round wheels 111, 112, 113, 114, 115, 120, 131, 132, 133, and 139.

The wheels 111, 112, 113, 114, and 115 which define the internal path along which a check may pass through the apparatus extend to a height (transversally to the plane of the figure) which is of the same order as the width of a check. These wheels are shown shaded. The check which is inserted via an inlet station 100 passes between wheels 111 and 112 and is then imprisoned between the portion 10 of the toothed belt and the wheel 112, and remains imprisoned in this manner up to the wheel 115. The bottom longitudinal edge of the check is kept on the path by a plate referenced 115, 165 in FIG. 3. After the plate there is a spring blade 170 described in greater detail below. There follows a print anvil 180.

On the other side, the check is held by a plate 150 from the inlet to the outlet, said plate 150 being higher at 151 in order to serve as a thrust surface for printing a fixed endorsement. After the wheel 113 there is another higher plate 161, and then a plate 162 which houses a magnetic character (CMC7 or E13B) reader head in the bottom portion thereof.

Finally, beyond the wheel 115, the check may be taken up by two high plates 125 and 126 which define a curved path enabling the check to almost completely leave the print station, before reversing.

Close to the plates 125 and 126 the toothed wheel 120 is provided with a stepper motor 121 which drives the belts 10, and which consequently drives the check accurately along its internal path through the apparatus.

As already described in the above specified prior patent applications, the belt forms an angle of about 165° with each wheel such as 113, 114, and 115, on the internal check path, thereby applying pressure to the check and driving it synchronously with the belt without any risk of slipping. However, it has been observed that the first wheel 112 may, in some applications, curve the belt through an angle which is greater than 165° and closer to being flat, with typical values of 170° to 175° being usable.

It thus appears that the check will follow the movement of the belt 10 and thus the movement of the stepper motor 121 with great accuracy. It is also necessary for the apparatus to acquire a reference position on the check. This is performed relative to the right-hand edge and the bottom edge of the check (as seen from in front). A first photoelectric barrier type detector 110 senses the insertion of a check to the inlet station 100, and consequently starts the stepper motor 121. As soon as its leading edge reaches the wheel 112, the check is driven by the belt 10 and thereafter it follows the belt. The position of the barrier is such that the starting of the stepper motor and the acceptance of the check are related to proper insertion thereof.

Thereafter, and whenever necessary, the stepper motor can drive the check to bring it up to the level of a second photoelectric barrier 119 which is used to give a reference position on the check along the internal path at any given moment. Thereafter, the position of the check relative to any of the stations which are to work thereon along the internal path can be determined since the positions of these stations along the internal path are known, and since the number of steps performed by the motor 121 is known at all times.

It is also necessary to ensure that the bottom edge of the check is indeed in contact with the carrier plate 1.

As shown in FIG. 4C, the belt 10 which passes through a recess 111a in the wheel 111, is located very close in this case, to the carrier plate 1, i.e. very close to the bottom edge of the check. When a check is inserted into the apparatus via the inlet station 100, it may thus tend to rise, which would spoil proper operation of the apparatus. This difficulty is solved in a particularly simple manner: as can be seen in FIGS. 3 and 4A, the support 140 has a brush 141 which rubs against the back of the check close to the top edge thereof. As a result there is a friction effect on the top edge of the check as the check enters the apparatus. This friction prevents the front edge of the check from rising and consequently keeps it in contact with the carrier plate 1 until it has been completely taken up by the belt 10. Thereafter, by virtue of friction with the belt 10 the check will remain in contact with the carrier plate 1.

It will immediately be seen that inversely, when the check is about to leave the apparatus after being fully processed, the friction effect due to the brush 141 tends to raise its free edge, thereby making it easier to grasp by the user.

FIG. 3 also shows, close to the brush 140 and 141, a curved guide member 142 intended to facilitate the return of a check between the wheels 111 and 112, even if the corners of the check are slightly curved. Similar members could also be placed at other points along the apparatus.

On the subject of check insertion, it is appropriate to make immediate reference to FIG. 4A which shows one embodiment of the inlet station 100 in detail. A plate 101 has a vertical face 102. It is fixed to a horizontal extension 103 which defines a sloping face 104 opposite the face 102, with said opposite faces forming a broad V which narrows progressively to become a slot 105 into which the check passes. This slot is defined by the plate 101 and by a facing plate 106. Further downstream, extensions 108 and 109 define a V in the opposite direction (looked at this time in a right cross-section), after which the above-mentioned inlet wheels 111 and 112 are located.

It now appears that once the check has been advanced as far as the detector 119, the stepper motor 121 can take it to any desired position relative to any of the stations to be found along the internal path.

This is only true providing the belt 10 is kept taut. Tension is simply provided at wheel 133 by subjecting said wheel to a resilient return force. FIG. 2 shows the resilient return being implemented by means of a spring blade 136 bearing against two supports 135 on the carrier plate 1.

According to an important characteristic of the invention, the print station 60 (FIG. 2) comprises, on one side of the internal path, a matrix print head having a body 60 and a cylinder of fins 62, said print head being mounted on a plate 201 and 202 which is hinged on a support 210 fixed to the carrier plate 1 of the apparatus. The carrier plate 203 also supports a transfer inking ribbon in a cassette 64 and driven by a motor which is also supported by the plate 203. Actuator means 200 enable vertical displacement to be applied to the print head along an arc of a circle (references TTI in FIGS. 5A and 5B). On the other side of the internal path, the print station comprises an anvil 180 whose working portion 181 is suitable for operating with any position of the print head over the circular arc TTI.

In order to do this, the anvil 180 and 181 may be fixed to the support plate 1. Its working portion 181 then extends horizontally by not less than the geometrical rise F of the circular arc TTI (FIGS. 5A and 5B).

Advantageously, the anvil 180, 181 has a recess 185 (FIG. 4B) for receiving the toothed belt 10 so that it is level with the remainder of the working portion 181. No printing is performed on the bottom portion of a check. It is therefore permissible to leave a gap between the belt 10 and the working portion 181.

In other applications, the anvil 180 and 181 receives the toothed belt 10 so that it is continuous with the working portion 181, thereby enabling printing to take place either directly against the anvil itself, or else against the belt where it is received in the recess 185 in the anvil.

In a variant, as is explained below, the anvil may also receive a transfer inking ribbon in a cassette 64 bis driven by a motor.

For greater clarity, there follows a description of the electronic portion of the apparatus and of its interactions with the various work stations along the internal path.

In FIG. 2, this electronic portion comprises a central control unit 2 interconnected with transaction units which may all be of conventional type, and which may operate in local mode (offline), or else in connect mode (on-line).

These transaction members simply indicate various parameters to the control unit, including at least the amount of the transaction which is presumed to be established between a customer and a trader using an apparatus in accordance with the invention.

The customer gives the trader a blank check form and the trader inserts it into the inlet station 100 of the apparatus.

Once the blank check form has been detected by the sensor 110, it passes along the internal path with the central unit 2 suitably actuating a unit 4 for controlling the driving stepper motor 121.

The check then passes in front of a station 50 which magnetizes the CMC7 or E13B characters on the check, under the control of a block 5 in FIG. 2.

The check passes in front of the sensor 119, after which the central unit 2 is capable of knowing the position of the check relative to each of the stations on the internal path, as already described. The drive motor is then reversed and the check passes a second time in front of the station 50 which reads the CMC7 or E13B characters. After this operation, the central unit 2 knows which bank issued the check. The check is then level with a print station 60.

By vertically displacing the print head (described in greater detail below) the central control unit causes a print control member 6 (together with a print ribbon motor control 9) to control the matrix print head 60 so as to print successively on the check:

the amount in figures in the box BPF;

the amount, again in figures, after the words "payez contre ce chéque" (pay in respect of this check);

the name of the beneficiary of the check after the word "á" (to); and the date and place of the transaction, the place being known since it is defined by the trader, and the date being updated by conventional means.

If the endorsement on the check is a variable endorsement, the print ribbon motor 3 is stopped and the endorsement print ribbon motor 9 bis is started so that the items relating to the endorsement (alphanumeric characters) can be printed by the same print head 60, with printing taking place through the check.

It must be understood that the operations of magnetizing and reading the CMC7 or E13B characters, the operations of printing line-by-line on the check, and the other subsequent operations all require constant back and forth movements of the check along the internal path, and that this is made possible by the fact that the central unit 2 knows the position of the check at all moments relative to each of the stations.

After printing on the check in the clear, the check moves backwards until level with a station 70 for printing the amount of the check in CMC7 or E13B characters, as an integral part of the CMC7 or E13B track (see FIG. 1).

To this end, a wheel 71 having CMC7 or E13B characters and provided with a position reference sensor represented by 72 (FIG. 3) is capable of being rotated to bring the required characters sequentially behind a ribbon 73 from a spool 74, with the ribbon being in contact with the front of the check. On the other side of the check, a hammer 79 is controlled by an electromagnet 77. The position of the print wheel 71 is defined by a stepper motor 75. The stepper motor 75 and the electromagnet 77 are both under the control of a block 7 in FIG. 2.

As is explained below, the motor 75 also serves as a drive member for vertical displacement of the print head, which is made possible by the great simplicity of this displacement.

If so desired, the new CMC7 or E13B characters which have just been printed may be reread by the station 50 and its read head 51.

Finally, the central control unit 2 may also actuate a block 8 which, in turn, excites an electromagnet 87 so that an inked stamp 89 applies a fixed form of endorsement words to the back of the check as determined by the trader using the apparatus.

Once all this has been done, the check may be returned via the inlet station 100 for signature on the front by the customer and on the back (either at once or later on) by the trader in order to complete the endorsement.

Any anomaly in filling in the check may be indicated, for example by emitting a sound and by not releasing the check completely from the internal path.

Figure 5:
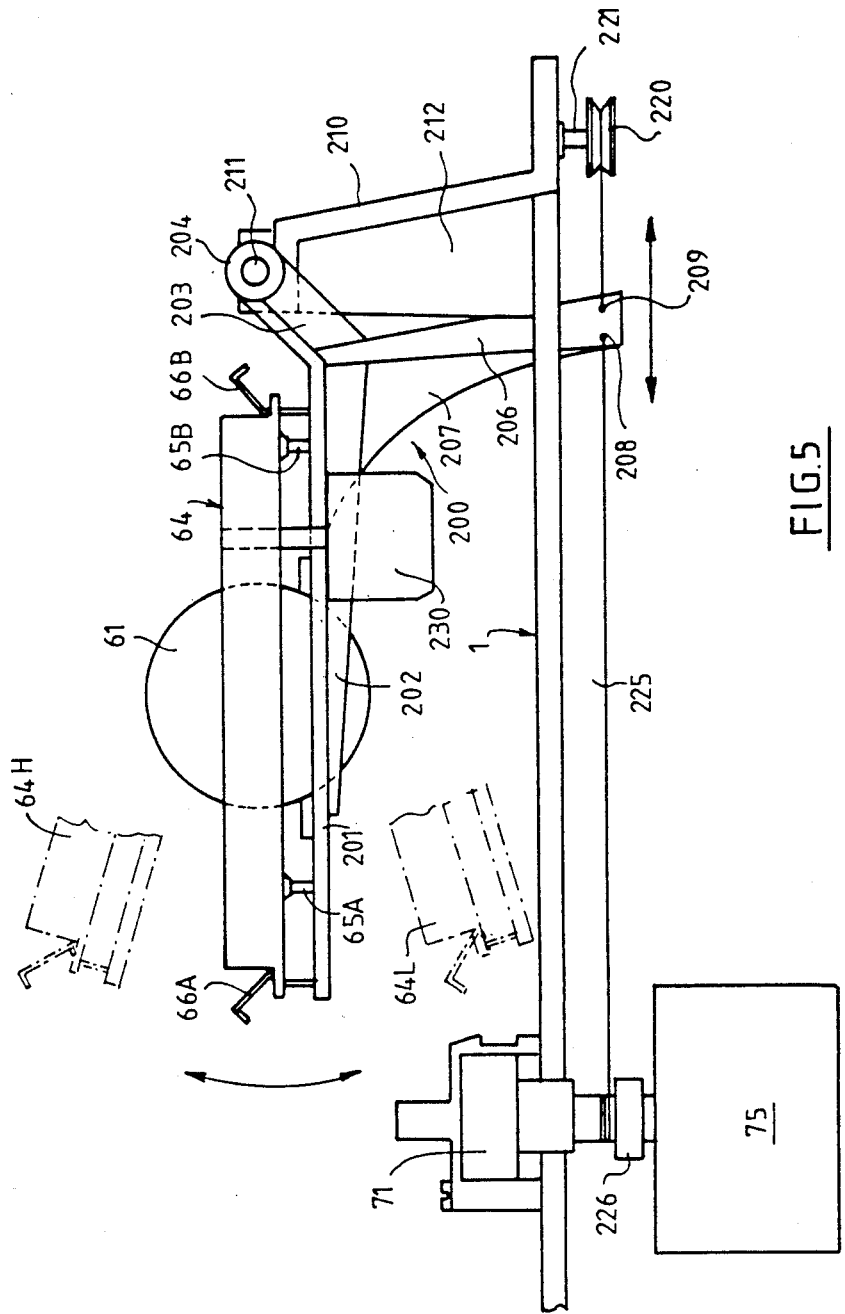
FIG. 5 is a detailed diagram of a first embodiment of a print head.
Figure 5A:
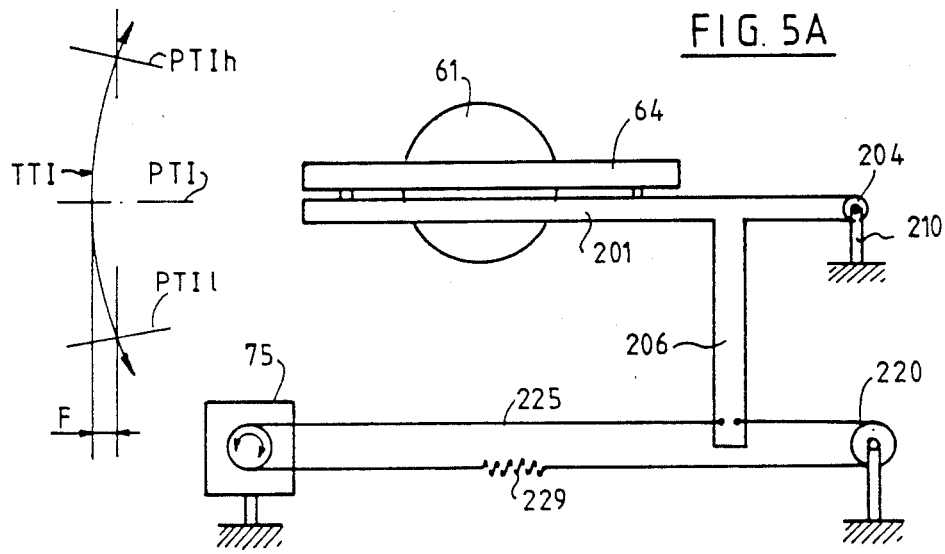
FIG. 5A is a theoretical diagram corresponding to FIG. 5.

Reference is now made to FIG. 5.

This figure shows the body 61 of the print head together with the spool 64 of print ribbon and the ribbon drive motor 230. Both of these members are mounted on a plate 201 having a supporting rib 202. These two parts curve at 203 and are hinged at 204 about a shaft 211 which is fixed to a bracket 210 having a rib 212 and fixed to the carrier plate 1.

At their curve, the parts 201 and 202 are fixed to a vertical riser 203 having a rib 207 with the end thereof passing through the carrier plate 1 via a hole, in order to be fixed at points 208 and 209 to two ends of a thread which, to the right, passes over a free running wheel 220 mounted on a shaft 221 fixed to the carrier plate.

The other end of the thread is wound, preferably several times, round the shaft which connects the stepper motor 75 to the to the wheel 71 for CMC7 or E13B printing above a shoulder 226 on said shaft.

FIG. 5A explains the operation of this assembly by means of a diagram in which the thread 225 which is shown extending horizontally in FIG. 5 is now shown as extending vertically for ease of comprehension.

The person skilled in the art will observe that the thread 225 has a spring 229 in order to compensate for changes in length due to the arcuate movement of the riser 206.

It is clear that rotation of the motor 75 causes axial displacement of the thread and thus rotates the print head 61 about the shaft 211.

The head then follows a path TTI between an intermediate position PTI where the head prints parallel to the lines on the check and positions PTIh and PTIl where the head prints at a slight angle.

The Applicant has observed that a slight print angle is completely tolerable and is difficult to observe with the naked eye.

Naturally, the geometrical rise F of the circular arc TTI is less than or equal to the working surface 181 of the anvil 180, as already mentioned.

FIG. 5 shows the top and bottom positions 64H and 64L taken by the print assembly, which is limited in this case at the extreme left-hand side where only the spool 64 can be seen.

Figure 6A:
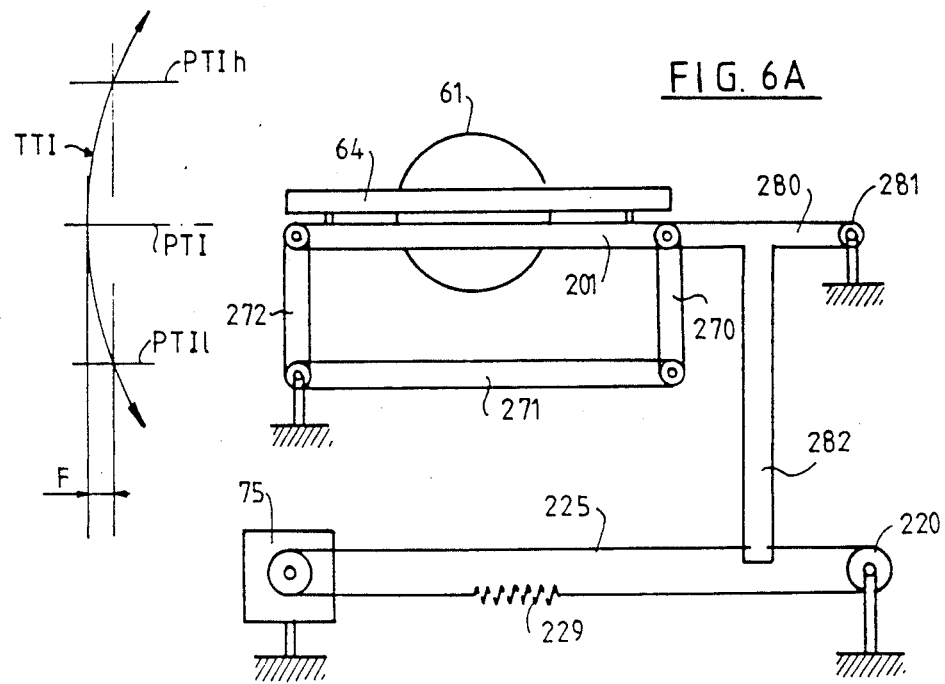
FIG. 6A is a theoretical diagram of apparatus including print head displacement comparable to that shown in FIG. 4.
Figure 6:
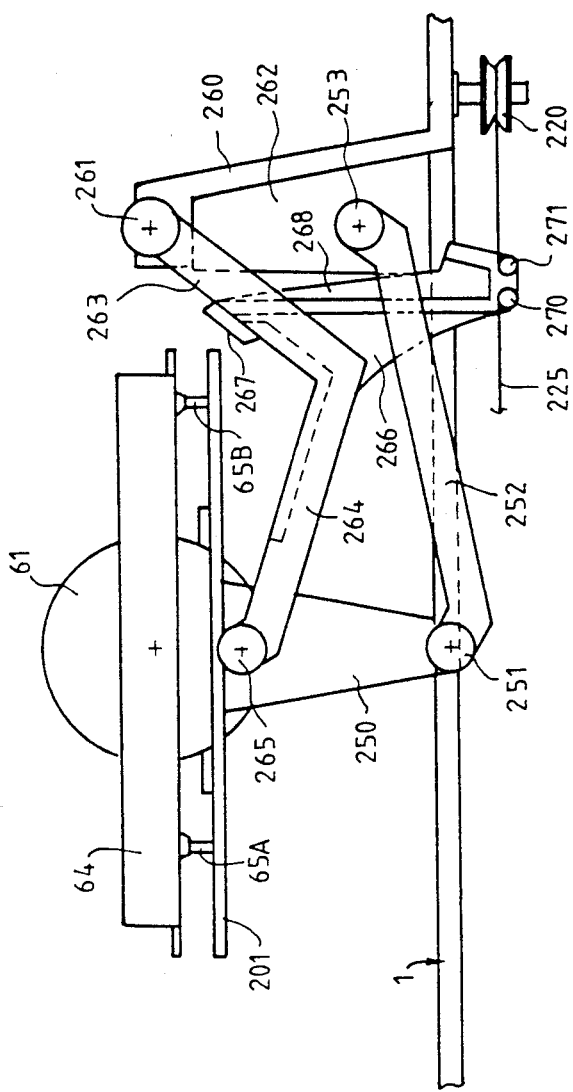
FIG. 6 is a detailed diagram of a second embodiment of print head displacement.

A variant of the invention is shown in FIG. 6.

The print head 61 and the spool 64 as supported by pegs 65A and 65B on a plate 201 is the same as before.

However, the plate 201 is now supported by a deformable parallelogram structure which is hinged to the frame.

Other embodiments are possible.

In the embodiment shown in FIG. 6, the plate 201 is fixed to a vertical riser 250 having two hinge points 251 and 265.

The hinge point 251 receives an arm 252 which is hinged at 253 on the frame 260 and 262, which is in turn fixed to the support plate 1.

The hinge point 265 of the part 250 receives a two-part curved arm 264 and 265 which is hinged at 261 to the top of the frame 260.

A knife structure is defined by a vertical part 268 having a rib 266 and a wedge 267, which parts engage the curved riser 263 and 264 as illustrated.

The bottom of this part 268 receives the two ends of the thread at 270 and 271, with the thread passing round and idler wheel 220 and the rest being similar to FIG. 5.

The person skilled in the art will understand that the vertical movement of the print head 61 is obtained as before along an arc of a circle. The difference with the FIG. 5 assembly lies in the print head now remaining parallel to itself as it moves along the arc. The letters it prints will then be slightly displaced when comparing one line to another, but they will be exactly vertical in each line. This displacement is very easily compensated by the microprocessor central unit and by its exact knowledge of the check due to the stepper motor drive.

FIG. 6A illustrated the deformable parallelogram structure in another diagrammatic version.

The plate 201 constitutes one of the arms of a deformable parallelogram having three other arms 270, 271 and 272, with the hinge between the arms 271 and 272 being fixed to the carrier plate 1.

The hinge between 201 and 270 is fixed to a horizontal arm 280 which presses at 281 against the shaft fixed to the carrier plate 1. The arm 280 is also fixed to a vertical riser 282 which is fixed as before to the two ends of the thread 225.

The diagram to the left of FIG. 6A shows that the print head is displaced between positions PTIl and PTIh while remaining parallel to itself.

One of the advantages of the above described device is that it enables controlled displacement of a check at a linear speed of about 500 mm per second, thus enabling numerous go and return passes of the check along the internal path as required from the above description, without the time taken to fill in the check becoming prohibitive.

FIG. 2A summarizes the steps 20 to 29 which take place while a check is being filled in, thus showing the operations which are successively controlled by the central unit 2 of FIG. 2.

Starting from the possibility of back and forth motion along the internal path, the Applicant has discovered in a manner which is a priori surprising, that it is possible to use a read head not only for reading the CMC7 or E13B characters, but also for the necessary magnetization thereof. Heretofore the practice has always been to use two separate heads, with manufacturers selling distinct magnetization heads and read heads.

In a variant, the magnetization head is sometimes replaced by a permanent magnet.

The Applicant has discovered that a read head such as that sold by the UK corporation Magnetic Components Limited under the reference number 17851 is quite capable at 24 volts of passing a magnetization current of about 10 to 15 milliamps for a period of time which is long enough to premagnetize the CMC7 or E13B characters on a check.

All that is then needed is an electronic switch, e.g. of the CMOS type, to connect the head 51 (see FIG. 3) either to a magnetization circuit or else to the read circuits which are conventionally associated with such a head.

The apparatus described above is intended to be installed on traders' premises to enable the checks of their customers to be filled in automatically and also to fully prepare checks not only for the endorsement formalities specific to the trader but also for the post-printing formalities which would otherwise take place in the bank.

In this respect, it may be observed that the printing in the clear on the check may either be performed using a normal character font or else using a double width and/or double height character font.

However, apparatus in accordance with the invention may also be used by banks themselves, for example with cash withdrawal checks given to bank customers and which the banks then have to pay out and fill in to their order.

Finally, and depending on the requirements for endorsing formalities and the name of the beneficiary of the check, the machine may be used more widely both in banks and in commercial premises or groups of commercial premises operating with different trading names.

Under such circumstances it is desirable to be able to print different endorsements on the back of a check. This is made possible with the embodiment shown in FIGS. 7 and 8.

This embodiment shows up another most advantageous aspect of the invention, namely front and/or back printing on request using a single print head and two ink transfer ribbons placed on either side of the document to be printed on.

Figure 7:
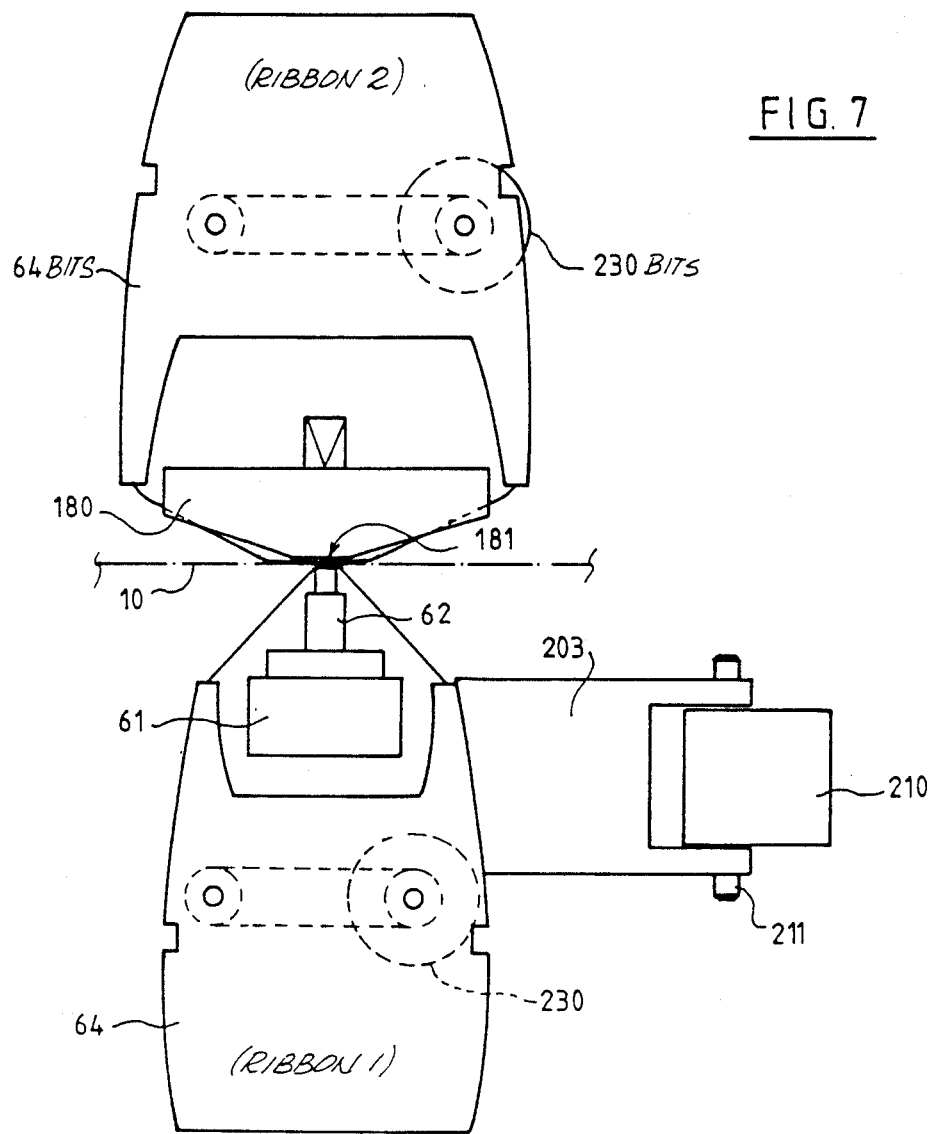
FIG. 7 is a diagram of a variant of the FIG. 3 apparatus, enabling variable endorsements to be printed.

In FIG. 7, the path of the check is indicated by the passage of the belt 10.

The print station 60 comprises not only the print head 60, 61 and its associated ribbon spool 64 having a motor 230 on the front side of the check (with the assembly being movable as described above about the shaft 211), but also on the reverse side another ribbon spool 64 bis having an independent motor 230 bis. The other ribbon passes over the print anvil 180, 181.

Printing takes place as follows:

initially at least one vertical line of points is printed on the front and reverse sides at a nonsignificant location on the check or on some other medium inserted to this end into the print station, thereby "whitening" both ribbons;

then, in order to print on the front of the check (or on the back) only the ribbon in the spool 64 is moved (or only 64 bis, as the case may be) at the same time as the check is moved. While reverse side printing is taking place, control signals are applied to the head which would be equivalent to providing mirror image writing on the front face.

The ribbon spool 64 bis may be fixed and include a ribbon which is wide enough to cover two successive lines of writing, for example, which is enough for an endorsement. In other applications, the ribbon spool 64 bis and its motor 230 bis may be fixed to the plate which supports the spool 64 nnd its motor 230 and thus be fixed thereto. Front and reverse face printing can then take place over the entire surface of the voucher.

A detailed control flow chart for the print station 60 is given in FIG. 8, using the convention that "ribbon 1" is the front face ribbon and "ribbon 2" is the reverse face ribbon.

Step 300 consists in detecting (member 119) the fact that the front edge of a check has arrived under the print head.

Step 301 consists in actuating all of the pins of the print head 61.

In order to clean both ribbons completely, this is done five times and the check is advanced each time by one print needle diameter (steps 302, and 303, looping back to 301).

A test 304 then determines whether printing is to take place on the front or reverse face.

If the front face is concerned, the ribbon 1 is advanced by one pin diameter (step 305) and a column is printed depending on which character is to be printed (step 306), and this continues until printing is completed (step 307, looping back to 305).

If the reverse face is concerned, steps 310 to 312 do the same except that step 310 advances the ribbon 2, and that the software writes a mirror image of the text.

In practice, step 304 also returns the check to its first print position, and thereafter it is moved to the appropriate location for printing.

If, after printing on one side of the check has been completed (320) it is necessary to print immediately on the other side, the flow chart returns to step 301.

The person skilled in the art will understand that this applies not only to checks but to numerous print devices of all kinds, and in particular to those described in the above-mentioned prior patent and patent applications.

What is claimed is:

1. Apparatus for processing vouchers such as checks, the apparatus comprising:
   (a) an inlet (100), an internal path (110-120), a carrier plate (1), a print station (66), drive means for driving said voucher from said inlet along said internal path, said drive means including wheels (111-120, 131-139) mounted on said carrier plate, a belt (10) pressed against wheels to follow a closed loop, a portion of said closed loop belt defining said internal path, said path passing level with said print station; said print station comprising:

(b) a print head (61,62) hinge-mounted (204,210) to said carrier plate on one side of said internal path, said print head being thereby subjected to a displacement along a circular arc (TTI) located in a plane substantially parallel with said voucher; and (c) an anvil (180,181) on the other side of said internal path for operating in any position of said print head on said circular arc, said anvil having a working station (181) having a horizontal extent not less than the geometrical rise (F) of said circular arc.

2. Apparatus according to claim 1, characterized in that the anvil (180, 181) is fixed to the carrier plate (1).

3. Apparatus according to claim 2, characterized in that the anvil (180, 181) receives said belt (10) in a recess (185), said belt being level with the remainder of its working portion (181).

4. Apparatus according to claim 3, characterized in that the anvil receives the belt (10) contiguously with its working portion (181).

5. Apparatus according to any one of claims 1 or 2 to 4, characterized in that the print head (61, 62) is simply hinged (204, 210) to the frame (1).

6. Apparatus according to any one of claims 1 or 2 to 5, characterized in that the print head (61, 62) is mounted on an arm (201) of a deformable articulated parallelogram structure (250, 252, 260, 263, 264) thereby enabling it to follow a circular arc path while remaining parallel to itself.

7. Apparatus according to claim 1, characterized in that the print head (61, 62) is a pin matrix print head.

8. Apparatus according to any one of claim 1, characterized in that the belt drives the voucher along a longitudinal edge thereof, and voucher brake means such as a brush (140, 141) are provided along the opposite longitudinal edge downstream from the first wheel (112) where the voucher passes between a wheel and the belt, thereby ensuring that the voucher is properly inserted with its longitudinal edge in contact with said carrier plate (1).

9. Apparatus according to claim 8, characterized in that it includes a voucher presence detector (110) such as a photoelectric barrier located upstream from said first wheel (112) and placed in the immediate vicinity of said carrier plate (1).

10. Apparatus according to claim 9, characterized in that it includes another presence detector (119) such as a photoelectric barrier located level with the print station (60) and likewise placed in the immediate vicinity of the thrust plate, thereby providing a position reference relative to the two edges of the voucher for printing thereon.

11. Apparatus according to claim 1, wherein the voucher is a check (CH) or the like, provided with automatically-readable standardized characters, characterized in that a station (50) is provided for reading said characters along said internal path, thereby enabling the voucher or the person issuing the voucher to be recognized and thus determining the print format to be used on the voucher.

12. Apparatus according to claim 11, characterized in that the standardized characters are of the magnetically encoded type, and the read station comprises a magnetic read head (51) for such characters, said head being used prior to reading for magnetizing said characters.

13. Apparatus according to claim 12, characterized in that the voucher is pressed against said magnetic head (51) by a spring blade (170).

14. Apparatus according to claim 1, characterized in that the internal path includes a station (70) for writing standardized characters for the purpose of immediate post-printing on the check of its amount using said standardized characters.

15. Apparatus according to claim 14, characterized in that the same motor, and in particular a stepper motor (75) is used both to drive the print head (60, 61) vertically, and to drive the standardized character writing station (70).

16. Apparatus according to claim 1, characterized in that the belt (10) is a toothed belt driven by a toothed wheel (120) mounted on the shaft of a stepper motor (121) and made taut (133, 134, 135) outside said internal path.

17. Apparatus according to claim 16, in that a belt guiding wheel (111) is provided at the inlet to the internal path, said wheel having a recess (111A) over which the belt passes so that it is level with the remainder of the surface of the wheel.

18. Apparatus according to claim 1, characterized in that it also includes a station (80) for writing a form of endorsement words on the reverse side of the voucher.

19. Apparatus according to claim 1 characterized in that it includes means (60, 64 bis) for writing a variable endorsement.

20. Apparatus for front/back printing paper, of the type comprising:

a pin matrix print head located at one side of said paper;
means for conveying said paper in relation to said pin matrix print head;
an anvil located on the other side of said paper;
a first ink transfer ribbon passing between said pin matrix print head and said paper;
operating means for operating typing and forward movement of said paper and said first ink transfer ribbon; and
a second ink transfer ribbon passing between said paper and said anvil, also operated by said operating means;
a vertical line of points being repetitively printed by said operating means before an effective printing without displacement of both of said ink ribbons in order to whiten them;
said paper and said first ink ribbon or said second ink ribbon being movable by said operating means according to whether it is a front or a back printing.

21. Apparatus according to claim 20 wherein said vertical line of points is printed on another medium.

22. Apparatus according to claim 20 wherein said vertical line of points is printed at a non-significant location of said paper.

23. Apparatus according to claim 20 incorporated in an apparatus for processing vouchers which comprises:

means for driving said voucher from an inlet along an internal path, said means for driving comprising a belt pressed against wheels mounted on a carrier plate to follow a closed loop, a portion thereof defining said internal path, said internal path passing level with said apparatus for front/back printing.

24. A method for operating a pin matrix print apparatus for front/back printing comprising the steps of:
(a) providing a first ink transfer ribbon at a front side of printing paper;
(b) providing a second ink transfer ribbon at a reverse side of the printing paper;
(c) printing a vertical line of points, repetitively, without moving the both ink ribbons until whitening them completely; and
(d) printing front or back, by moving respectively the paper and first or second ink ribbon.

25. The method according to claim 24 wherein, when printing back, the pin print apparatus being operated to print a mirror image of the text.

* * * * *

UNITED STATES PATENT AND TRADEMARK OFFICE
CERTIFICATE OF CORRECTION

PATENT NO. : 4,786,789

DATED : November 22, 1988

INVENTOR(S) : Michel M. Gaucher

It is certified that error appears in the above-identified patent and that said Letters Patent is hereby corrected as shown below:

On the Front Page

Abstract, line 2, change "a", second occurrence, to -- an --.

Column 1, line 63, after "in" insert -- a --.

Column 3, line 41, change "hand written" to -- handwritten --.
Column 3, line 51, change "inter-bank" to -- interbank --.

Column 6, line 30, change "offline" to -- off-line --.

Column 7, line 67, before "wheel" delete -- to the --.

Column 8, line 36, change "1s" to -- is --.
Column 8, line 47, change "and" , first occurrence to -- an --.

UNITED STATES PATENT AND TRADEMARK OFFICE
CERTIFICATE OF CORRECTION

PATENT NO. : 4,786,789

DATED : November 22, 1988

INVENTOR(S) : Michel M. Gaucher

It is certified that error appears in the above-identified patent and that said Letters Patent is hereby corrected as shown below:

Column 11, line 37, before "claim 1" delete "any one of"

Column 12, line 21, after "16," insert -- characterized --.

Column 14, line 1, before "both" delete -- the --.

Signed and Sealed this

Twenty-seventh Day of February, 1990

Attest:

JEFFREY M. SAMUELS

*Attesting Officer*     *Acting Commissioner of Patents and Trademarks*